(12) United States Patent
Ribble et al.

(10) Patent No.: US 9,275,800 B2
(45) Date of Patent: Mar. 1, 2016

(54) METHOD OF NANO-PATTERNING A FOIL SURCE

(71) Applicant: Pacesetter, Inc., Sunnyvale, CA (US)

(72) Inventors: Bruce Ribble, Easley, SC (US); Ralph Jason Hemphill, Pickens, SC (US); David Bowen, Taylors, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 218 days.

(21) Appl. No.: 14/134,112

(22) Filed: Dec. 19, 2013

(65) Prior Publication Data

US 2015/0179348 A1    Jun. 25, 2015

(51) Int. Cl.
*H01G 9/055* (2006.01)
*H01B 13/00* (2006.01)
*H01G 9/045* (2006.01)

(52) U.S. Cl.
CPC ............... *H01G 9/055* (2013.01); *H01G 9/045* (2013.01); *Y10T 428/24917* (2015.01)

(58) Field of Classification Search
None
See application file for complete search history.

(56) References Cited

U.S. PATENT DOCUMENTS

| | | | | |
|---|---|---|---|---|
| 4,350,563 | A * | 9/1982 | Takada | H01L 21/02071 204/192.32 |
| 6,224,738 | B1 * | 5/2001 | Sudduth | C25D 11/06 205/221 |
| 6,736,956 | B1 * | 5/2004 | Hemphill | B23H 9/00 205/221 |
| 7,150,767 | B1 * | 12/2006 | Schneider | H01G 9/045 29/25.03 |

* cited by examiner

*Primary Examiner* — Shamim Ahmed
(74) *Attorney, Agent, or Firm* — Theresa A. Raymer

(57) ABSTRACT

A method for patterning a metal substrate includes a series of surface treatments to control tunnel initiation at a micron or sub-micron level. In particular, the series of surface treatments include forming a hydration layer which acts as a mask while etching the surface of the metal substrate. The hydration layer mask enables control of the tunnel initiation on a micron or sub-micron level because the etching does not undercut the interface between the metal substrate and the hydration layer. As a result, the tunnels can be initiated in an orthogonal direction and closer together, thereby increasing the tunnel density.

20 Claims, 3 Drawing Sheets

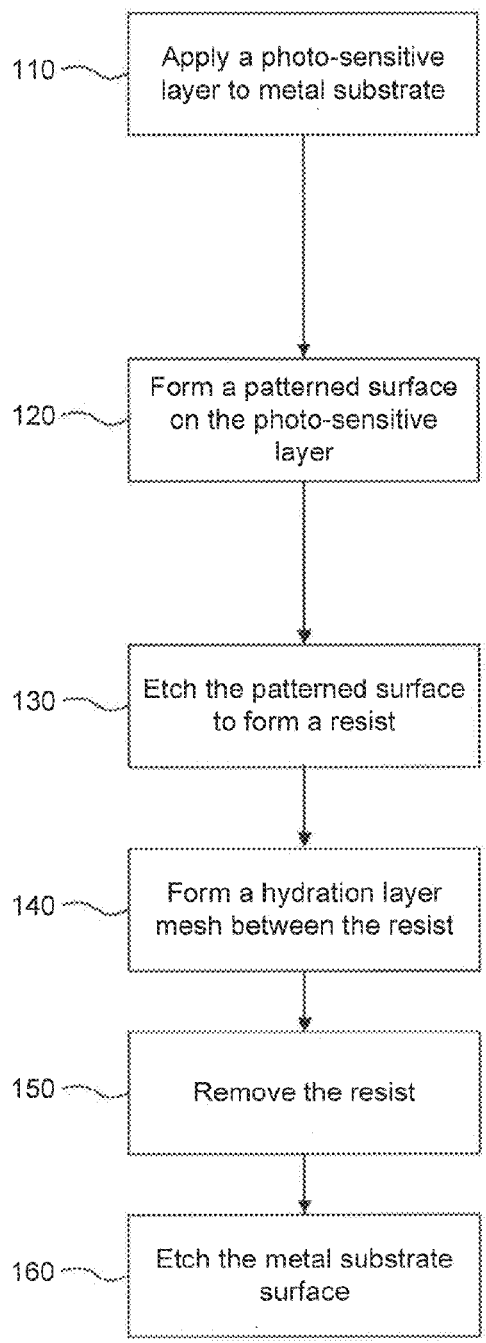
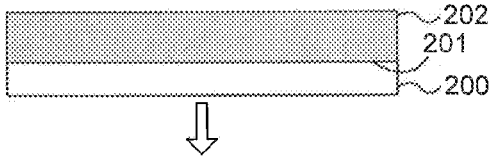
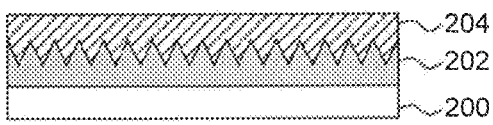
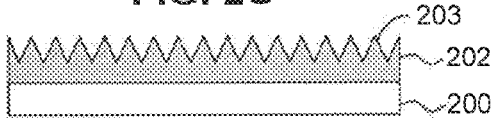
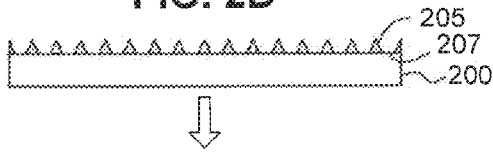
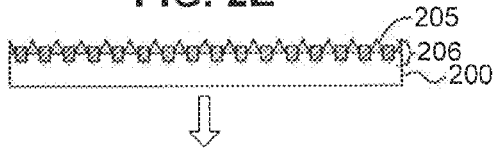
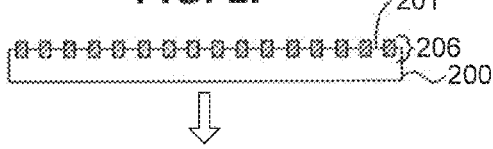
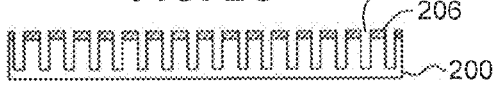

METHOD OF NANO-PATTERNING A FOIL SURCE

BACKGROUND OF THE INVENTION

1. Field of the Invention

The present invention relates to patterning of a foil surface. More particularly, the present invention relates to etching an aluminum foil for use in electrolytic capacitors.

2. Related Art

Electrolytic capacitors are compact, high voltage energy storage means used in many applications, including implantable medical devices. For example, Implantable Cardioverter Defibrillators (ICDs) conventionally include electrolytic capacitors because such capacitors have a high energy density and can withstand a relatively high voltage. ICDs typically use two electrolytic capacitors in series to achieve the desired high voltage for shock delivery. For example, an ICD can utilize two 250 to 500 volt electrolytic capacitors in series to achieve a voltage of 500 to 1,000 volts.

Conventionally, an electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

These capacitors must typically store approximately 10-100 joules. Because the capacitance of an electrolytic capacitor increases with the surface area of its electrodes, increasing the surface area of the aluminum anode foil results in increased capacitance per unit volume of the electrolytic capacitor. Thus, their size can be relatively large, and it can be difficult to package them in a small implantable device. Currently available ICDs are relatively large devices (over 20 to 40 cubic centimeters (cc)), generally about 12-16 millimeters (mm) thick. A patient who has a device implanted can often be bothered by the presence of the large object in his or her pectoral region. For the comfort of the patient, it is desirable to make smaller ICDs. The size and configuration of the capacitors contribute 9 to 12 cc of the ICD volume.

In ICDs, as in other applications where space is a critical design element, it is desirable to use capacitors with the greatest possible capacitance per unit volume. By electrolytically etching aluminum foils, an enlargement of a surface area of the foil will occur without enlargement of the overall capacitor. As a result of this enlargement of the surface area, electrolytic capacitors can obtain a given capacity with a smaller volume than an electrolytic capacitor which utilizes a foil with an unetched surface. Likewise, etched-foil capacitors of a given volume can obtain a higher capacitance compared to unetched-foil capacitors.

Etching the foil increases the surface area of the foil by roughening an otherwise flat surface. A metal foil can be etched according to any method that increases the surface area, such as electrochemical etching, roughening the foil surface mechanically and chemical etching. Electrochemical etching increases the surface area of the foil by electrochemically removing portions of the foil to create etch tunnels. Electrochemical etching is done according to any known etch process, such as the ones discussed in U.S. Pat. No. 4,474,657 to Arora; U.S. Pat. No. 4,518,471 to Arora; U.S. Pat. No. 4,525,249 to Arora and U.S. Pat. No. 5,715,133 to Harrington et al., each of which is incorporated herein by reference in its entirety.

In a conventional electrolytic etching process, surface area of the foil is increased by removing portions of the aluminum foil to create etch tunnels. The foil used for such etching is typically an etchable aluminum strip of high cubicity. The etch initiation and hence the gain or capacitance of the foil is the result of several variables, such as foil cubicity, thermal oxide on the foil, and the electrochemical reaction.

As tunnel density (i.e., the number of tunnels per square centimeter) is increased, a corresponding enlargement of the overall surface area will occur. Larger surface area results in higher overall capacitance.

Creating a pattern on an aluminum foil surface has been previously demonstrated as a means to successfully increase surface area. For example, U.S. Pat. No. 7,150,767 to Schneider, et al., which is incorporated herein by reference in its entirety, discloses an etching process which applies a holographic image to a photoresist coated on a foil to create a pattern of photoresist on the foil prior to etching. The photoresist pattern on the foil surface allows for positional control of tunnel initiation. Alternatively, U.S. Pat. No. 6,224,738 to Sudduth, et al. and U.S. Pat. No. 6,736,956 to Hemphill et al., which are incorporated herein by reference in their entirety, disclose etching processes which utilize masking to control tunnel initiation.

By controlling the position of tunnel initiation, foils are etched more uniformly and have optimum tunnel distributions. The difficulty arises, however, in attempting to control the pattern on a 0.1 to 5 micron (μm) scale. Typical etching processes used to initiate tunnel formation can undercut a patterned resist. Tunneling can begin in directions other than orthogonal to the foil surface. This can cause release of the photoresist, increase the brittleness of the foil, and/or reduce the optimization of the morphology of the foil surface. There is a need therefore for a process of foil etching for use in electrolytic capacitors which allows for improved control of tunnel initiation on a micron or sub-micron level.

SUMMARY OF THE DISCLOSURE

Disclosed herein are methods to improve upon prior etching techniques by optimizing the morphology and distribution of tunnels in a metal foil surface. It is important to control the initiation of the tunnels for the reasons stated above. Tunnel initiation can be controlled through the use of a hydrate layer on a metal substrate surface.

Also disclosed herein is a method for patterning a metal substrate, the method including the steps of: applying a photo-sensitive layer on a surface of a metal substrate; forming a patterned surface on the photo-sensitive layer; removing at least a portion of the patterned surface of the photo-sensitive layer to create a patterned resist and a plurality of unmasked areas on the metal substrate; forming a hydrate layer in at least one of the unmasked areas; removing the patterned resist to expose at least one portion of the surface of the metal substrate; and etching at least one exposed portion of the surface of the metal substrate to initiate tunnels in the metal substrate, thereby forming a patterned metal substrate, wherein the hydrate layer acts as a mask during the etching.

Further disclosed herein is a method of manufacturing a patterned aluminum foil for use in an electrolytic capacitor, the method comprising the steps of applying a photo-sensitive layer on a surface of an aluminum foil; forming a patterned surface on the photo-sensitive layer; plasma etching the patterned surface of the photo-sensitive layer to create a patterned resist and unmasked areas on the aluminum foil; forming a hydrate layer mesh in the unmasked areas; removing the patterned resist to expose the surface of the aluminum foil; and electrochemically etching the exposed surface of the aluminum foil to initiate tunneling of the aluminum foil to form the patterned aluminum foil surface, wherein the hydrate layer mesh acts as a mask during the electrochemical etching.

Additionally disclosed herein is a method for patterning a metal substrate, the method comprising the steps of: applying a photo-sensitive layer on a surface of a metal substrate; forming a patterned surface formed of an array of microstructures on the surface of the photo-sensitive layer; removing at least a portion of the patterned surface of the photo-sensitive layer to create (i) a patterned resist having a microstructure array configuration corresponding to and dimensionally proportional to the patterned surface and (ii) at least one unmasked portion of the surface of the metal substrate; forming a hydrate layer mesh in the at least one unmasked portion of the surface of the metal substrate; removing the patterned resist to expose at least one portion of the surface of the metal substrate; and etching the at least one exposed portion of the surface of the metal substrate to initiate tunnels in the metal substrate, thereby forming a patterned metal substrate, wherein the hydrate layer acts as a mask during the etching.

Also disclosed herein are the patterned metal substrates resulting from the methods disclosed herein. For example, a patterned metal substrate can include a metal substrate having a first surface and a second surface; a hydrate layer incorporated into the first surface; and a plurality of tunnels extending from the first surface. In some embodiments, the hydrate layer can have a thickness in a range from 0.1 to 1 micron. In some embodiments, a hydrate layer can also be incorporated into the second surface of the metal substrate.

BRIEF DESCRIPTION OF THE DRAWINGS

The accompanying drawings are incorporated herein and form part of the specification. Together with the detailed description, the drawings further serve to explain the principles of and to enable a person skilled in the relevant art(s) to make and use the devices presented herein.

FIG. 1 is a flowchart of illustrating a process for patterning the foil surface according to an exemplary embodiment.

FIG. 2A is an enlarged, cross-sectional view of an exemplary surface after a step of applying a photo-sensitive layer to a metal foil substrate.

FIG. 2B is an enlarged, cross-sectional view of an exemplary surface after a step of applying a mold to emboss the photo-sensitive layer.

FIG. 2C is an enlarged, cross-sectional view of an exemplary surface after a step of curing the photo-sensitive layer and removing the mold.

FIG. 2D is an enlarged, cross-sectional view of an exemplary surface after a step of etching the photo-sensitive layer to form a patterned resist.

FIG. 2E is an enlarged, cross-sectional view of an exemplary surface after a step of forming a hydrate layer on the surface of the metal foil substrate.

FIG. 2F is an enlarged, cross-sectional view of an exemplary surface after a step of removing the patterned resist.

FIG. 2G is an enlarged, cross-sectional view of an exemplary surface after a step of etching the metal foil substrate.

DETAILED DESCRIPTION OF THE INVENTION

Figure 3:
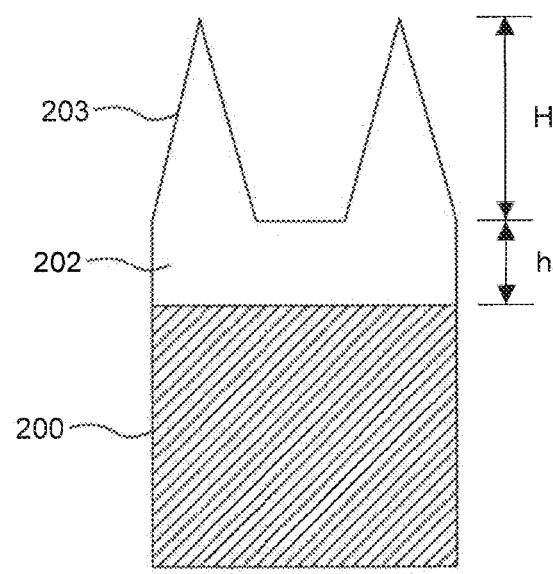
FIG. 3 is an enlarged, cross-sectional view of an exemplary surface shown in FIG. 2C.

The present invention will be described with reference to the accompanying drawings, in which like reference numerals refer to similar elements. While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

A series of surface treatments can be performed on a metal foil surface to control tunnel initiation on a micron or sub-micron level, for example on a 100 nm to 5 µm scale, to create, for example, anodes for an electrolytic capacitor. As tunnel density (i.e., the number of tunnels per square centimeter) is increased, a corresponding enlargement of the overall surface area will occur. Larger surface area results in higher overall capacitance. Thus, controlling tunnel initiation on a micron or sub-micron level to create a periodic array of etch tunnels will increase the surface area of the foil and raise capacitance by 2.5 to 3 times. The foil can be used as anodes, which in turn are used in assembling a capacitor. The increased surface area for the anodes equates to a reduction in overall capacitor volume of about 50-66%, which in terms of current ICD volume is a 9 to 12 cc reduction. Or alternatively, fewer anodes are needed to deliver the same energy output, thereby reducing production costs of the capacitor.

Forming a hydration layer can be one of the surface treatments. The hydration layer can act as a mask while etching the surface of the metal foil, and thereby can enable control of the tunnel initiation on a micron or sub-micron level, for example on a on a 100 nm to 5 µm scale. In some embodiments, the presence of the hydration layer minimizes, or completely eliminates, undercutting during etching. For example the etching process does not weaken the interface between the hydration layer and the foil surface. This minimizes the likelihood that etch tunnels will begin in directions other than orthogonal to the foil surface. As a result, the tunnels can be initiated closer together, thereby increasing the tunnel density without fear that adjacent tunnels will converge.

As depicted in FIG. 1, a series of steps can be performed to impart a pattern on a metal substrate. FIG. 1 is a high level flowchart of an exemplary method for preparing and etching a surface of a metal substrate. FIGS. 2A-2G depict an exemplary cross-sectional view of the metal substrate after each step. Though the surface modification described below is explained regarding a single surface, one of ordinary skill will appreciate that the process can be repeated, simultaneously or sequentially, on an opposing side of the metal substrate to maximize surface area on both sides of the substrate.

The method can include a step 110 of applying a photo-sensitive layer to a surface of a metal substrate to form a multilayer composite. As depicted in FIG. 2A, the multilayer composite can include a metal substrate 200 having a first surface 201 and a photo-sensitive layer 202 applied to first surface 201 of metal substrate 200. In some embodiments, metal substrate 200 can be in the form of a foil with thickness in the range of 85 to 125 microns, preferably 100 to 115 microns. In some embodiments, the etched foil resulting from the process can be used as an electrode in a capacitor, such as an anode or a cathode. As such, in some embodiments, metal substrate 200 can be a material typically used as an anode or cathode. Anode and cathode foils can be made of metal (for example, aluminum), metal alloy, or a metal composite material. Aluminum foils are well known in the art and are commercially available. In some embodiments, the foil is aluminum with purity of at least about 99.96%, preferably about 99.98-99.99%, aluminum and at least about 80% cubic texture. Alternative materials to aluminum include, but are not limited to, zinc, zirconium, tantalum, magnesium, niobium, and alloys of any or all of these metals.

In some embodiments, photo-sensitive layer 202 can be an ultraviolet-curable (UV-curable) photopolymer that undergoes UV polymerization. In some embodiments, a UV curable photopolymer can be spread on first surface 201 of metal substrate 200 to have a thickness of about 0.1 to 50 µm. Upon drying, the photopolymer can be exposed to UV light to cure it.

The method of forming a patterned surface on a metal substrate can include a step 120 of forming a patterned surface 203 on photo-sensitive layer 202. As shown in FIG. 2B, a mold 204 can be pressed or embossed onto photo-sensitive layer 202 that has been applied to surface 201 of metal substrate 200. Mold 204 can have a surface pattern, for example, a nano-patterned array of spaced-apart microstructures. After curing the photo-sensitive layer 202, mold 204 is released from the surface of photo-sensitive layer 202 to leave patterned surface 203 on photo-sensitive layer 202 having an array of microstructures complementary in shape to those of mold 204 as shown in FIG. 2C.

Prior to forming patterned surface 203 on photo-sensitive layer 202, mold 204 is prepared. In some embodiments, a patterned sapphire substrate serves as a master that can be replicated into mold 204. The sapphire master has a patterned array of microstructures, e.g. hemispherical bumps on the surface of the substrate. In one embodiment, the microstructures can be in the range of from 0.1 to 5.0 microns in diameter. A releasing agent can be deposited onto the master substrate. This can be accomplished, for example, via silanization with a fluorinated molecule as is known in the art. A molding material can then be deposited on the substrate to form a complementary nano-pattern on the surface of a molding material. In some embodiments, the molding material can be a silicon-based organic polymer, such as polydimethylsiloxane (PDMS). Upon curing, this molding material can form mold 204.

The microstructures of the sapphire master and/or mold 204 are not limited to hemispherical bumps. The microstructures can be of any appropriate shape and configuration, including micro-convexities or micro-concavities. In some embodiments, the shape of the microstructures can include, but is not limited to rectangular, hexagonal, conical, frusto-conical, hemispherical, and cylindrical. The microstructures can be arranged in any appropriate configuration, e.g. aligned or staggered in columns and rows. Once the mold is imparted with an appropriate surface morphology, it can be used in conjunction with the method described herein.

In some embodiments, patterned surface 203 is complementary in shape to the surface pattern of mold 204. Thus in some embodiments, mold 204 imparts patterned surface 203 with a nano-patterned array of spaced-apart microstructures. In some embodiments, the shape of the microstructures on patterned surface 203 can include, but is not limited to rectangular, hexagonal, conical, frusto-conical, hemispherical, and cylindrical. In some embodiments, the microstructures of patterned surface 203 can have an array microstructures wherein the microstructures have a width of in the range of 0.1 to 5 µm and/or a period (i.e., the center to center distance between adjacent microstructures) of about 1 to 3.0 µm. In an example embodiment, the microstructures have a width of about 1 µm and/or a period of about 1.5 µm.

Returning to the method of patterning metal substrate 200, FIG. 3 represents a magnified view of FIG. 2C. As shown in FIG. 3, patterned surface 203 on photo-sensitive layer 202 includes a lower portion with a height h and an upper portion with a height H. In some embodiments, height h is the minimum height of photo-sensitive layer 202, i.e. height h can correspond to indented areas of photo-sensitive layer 202 between microstructures of patterned surface 203. Height H can correspond to the maximum height of surface 203 of photo-sensitive layer 202 minus the minimum height h. In other words, height H can represent the height of the microstructures. In some embodiments, the total height H+h of photo-sensitive layer 202 can be from about 10 µm to about 50 µm. In some embodiments, height H is greater than height h.

Next, the method can further include a step 130 of etching patterned surface 203 to form a patterned resist 205. Patterned surface 203 can be etched uniformly to remove a portion of photo-sensitive layer 202. Etching can include, but is not limited to, plasma etching, for example with oxygen plasma. In some embodiments, etching step 130 can be used to reduce photo-sensitive layer 202 down to a patterned resist 205 as shown in FIG. 2D. In some embodiments, photo-sensitive layer 202 can be reduced by a thickness corresponding to height h. This can create a patterned resist in the form of an array of sub-micron bumps or other microstructures with first surface 201 of metal substrate 200 exposed around them. Thus, patterned resist 205 masks a portion of surface 201 of metal substrate 200, but leaves areas 207 interspersed throughout patterned resist 205 where surface 201 of metal substrate 200 is exposed. In some embodiments, when photo-sensitive layer 202 is reduced by height h, exposed areas 207 correspond to areas between the microstructures of photo-sensitive layer 202. Thus, in some embodiments patterned resist 205 can resemble patterned surface 203 in that patterned resist 205 has a same array configuration of microstructures and/or is dimensionally proportional to patterned surface 203.

The method can include a step 140 of forming a hydrate layer 206 in exposed areas 207 of resist 205. As shown, for example, in FIG. 2E, hydrate layer 206 can be formed only in the unmasked areas of metal substrate 200 (i.e., exposed areas 207). In some embodiments, hydrate layer 206 can be created by dipping surface 201 of metal substrate 200 in a bath of water. Water reacts with the exposed areas of metal substrate 200 to form hydrate layer 206 above and below surface 201 of metal substrate 200. Hydrate layer 206 thus forms a mask above and below surface 201 of metal substrate 200 thereby forming a layer of protection that extends below surface 201 of metal substrate 200. In some embodiments, the thickness of hydrate layer 206 is about 0.1 to 1 microns.

The following is an exemplary process for creating a hydrate layer when an aluminum foil is used as metal substrate 200. The aluminum foil can be dipped in 95° C. deionized (DI) water for 4 to 12 min, preferably 8 min, to form aluminum hydroxide above and below the surface in the areas not protected by patterned resist 205. In some embodiments, the temperature of the water is in a range from 70 to 100 degrees Celsius. The length of time to form the hydrate layer 206 of a desired thickness is determined in part by the temperature as the higher the temperature, the shorter the length of time to form a hydrate layer, as would be appreciated by one of ordinary skill in the art.

In some embodiments, the hydration process does not remove patterned resist 205 and only creates hydrate layer 206 in exposed areas 207 in patterned resist 205. The presence of patterned resist 205 prevents formation of hydrate layer 206 in areas covered by patterned resist 205 resulting in hydrate layer 206 forming a mesh or lattice with a honeycomb configuration in exposed areas 207.

Figure 4:
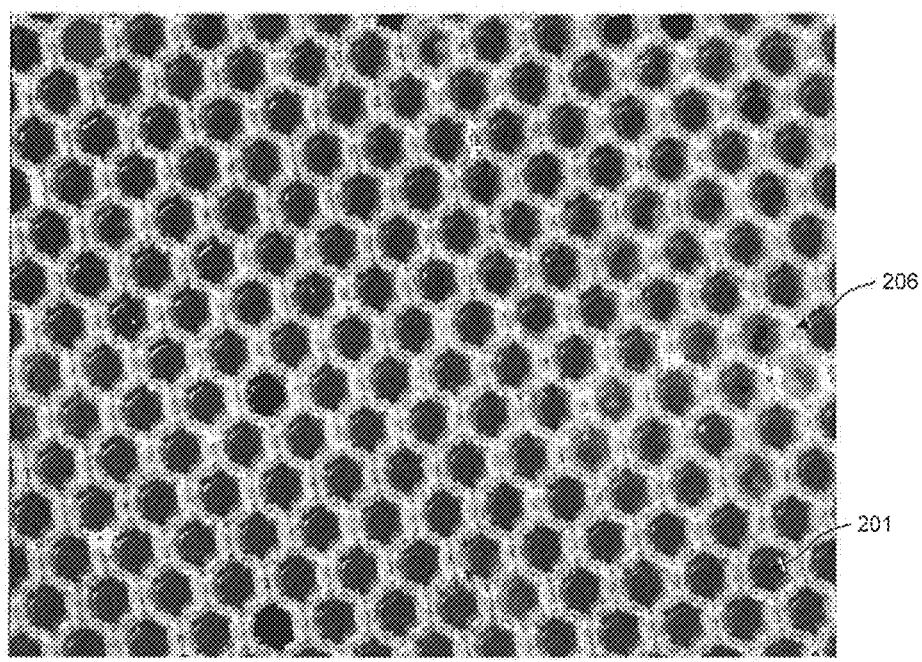
FIG. 4 is a plane view of an exemplary hydrate layer.

The method can include a step 150 of removing patterned resist 205 to expose at least one portion of surface 201 of metal substrate 200. Removing patterned resist 205 can include, but is not limited to, using a non-chemically aggressive agent. Chemically removing the patterned resist 204 leaves behind the hydrate layer mask 206. For example, where an aluminum foil is elected, a non-chemically aggressive solution to aluminum, such as ethyl lactate, can be used to remove a polymer resist 205. The ethyl lactate solution does not remove the hydrate layer, only the polymer resist. Thus, as shown in FIG. 2F, the metal substrate surface 201 is masked by the hydrate layer 206, yet exposed in area previously covered by patterned resist 205. As depicted in FIG. 4, in some embodiments, hydrate layer 206 can form a mesh or lattice with a honeycomb configuration around areas of exposed metal substrate surface 201. The areas of exposed metal substrate surface 201 can have a width of about 0.1 to 5 µm and/or a period (i.e., the center to center distance between adjacent exposed areas) of about 1 to 3.0 µm. In an example embodiment, areas of exposed metal substrate surface 201 can have a width of 1.0 µm and/or a period of about 1.5 µm.

The method can include a step 160 of etching metal substrate surface 201 to initiate tunnels. In some embodiments, the etching can include, but is not limited to electrochemical etching. Thus, in some embodiments, after hydrate layer 206 is created and patterned resist 204 is removed, metal substrate 200 can be placed in an etching solution known by those skilled in the art to electrochemically create tunnels 208 only in the areas of unmasked metal substrate surface 201. As shown in FIG. 2G, a pattern of tunnels 208 can be created having substantially uniformly-distributed tunnels in metal substrate 200 to maximize a surface area of metal substrate 200. The process outlined in FIG. 1 provides a higher etch tunnel density and higher capacitance as a result of using hydrate layer 206 as a mask when performing etching step 160. Thus, in some embodiments, the methods disclosed herein result in a patterned metal substrate 200, as shown for example in FIG. 2G, having a first surface 201 and an opposing second surface, a hydrate layer 206 incorporated into first surface 201, and a plurality of tunnels 208 formed in and extending from first surface 201. In some embodiments, the process steps disclosed herein are also formed on a second surface of metal substrate 200 such that the second surface also has a hydrate layer incorporated into it.

As discussed above, if a polymer mask is used when etching surface 201, etching step 160 can undercut a polymer mask, which leads to tunnels which are not orthogonal to surface 201. As a result, when using a polymer mask the tunnel initiation spots need to be spaced further apart to prevent adjacent tunnels from converging. This does not allow for maximizing the surface area of metal substrate 200. By contrast, the presence of hydrate layer 206 can minimize, or completely prevent, undercutting of the interface of hydrate layer 206 and metal surface 201. Further, the direction of tunnel initiation is controlled at metal substrate surface 201 because a portion of hydrate layer 206 has formed below metal substrate surface 201. Thus, tunnels initiate orthogonal to metal substrate surface 201 and the portion of hydrate layer 206 below surface 201 can prevent the tunnels from angling outward.

In some embodiments, metal substrate 200 is etched according to any method that increases the surface area, for example electrochemical etching, as is known to one skilled in the relevant art. Electrochemical etching can increase the surface area of metal substrate 200 by electrochemically removing portions of metal substrate 200 to create etch tunnels.

In some embodiments, surface 201 can be etched in an aqueous halide based etch solution, preferably a hydrochloric acid or sodium chloride solution, according to a conventional etch process; for example, U.S. Pat. No. 5,715,133 to Harrington et al, describes a suitable method of etching foil and is incorporated herein by reference in its entirety. The etch solution preferably consists of about 1.5% by weight sodium chloride, about 3.0% by weight sodium perchlorate, about 3% by weight glycerin, 0.5% by weight sodium sulfate, and deionized water. The etch solution preferably is heated to a temperature in the range of about 60° C. to about 95° C., preferably 35° C. The foil is etched at a DC current density of about 0.01 A/cm$^2$ to about 0.50 A/cm$^2$, preferably about 0.15 A/cm$^2$. A charge of about 15 coulombs/cm$^2$ to 100 coulombs/cm$^2$, preferably about 30 coulombs/cm$^2$, is passed through the foil during the etching process, which requires an etch time in the range of about 2 minutes to about 12 minutes.

After etching, the foil can be further processed in a combination of optional steps such as widening, forming and finishing steps. For example, after etching, the foil can be removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 to Arora and U.S. Pat. No. 4,525,249 to Arora, both of which are incorporated herein by reference in their entirety.

After the etch tunnels have been widened, the foil is again rinsed with deionized water and dried. Finally, a barrier oxide layer can be formed onto one or both surfaces of the metal foil by placing the foil into an electrolyte bath and applying a positive voltage to the metal foil and a negative voltage to the electrolyte. Preferably, the dielectric oxide layer is grown anodically in an aqueous formation electrolyte, with a minimum voltage that is 10% greater than the intended working voltage of the finished capacitor. The barrier oxide layer provides a high resistance to current passing between the electrolyte and the metal foils in the finished capacitor, also referred to as the leakage current. High leakage current can result in the poor performance and reliability of an electrolytic capacitor. In particular, high leakage current results in greater amount of charge leaking out of the capacitor once it has been charged.

The formation process can include applying a voltage to the foil through an electrolyte such as boric acid and water or other solutions familiar to those skilled in the art, resulting in the formation of an oxide on the surface of the anode foil. In some embodiments, the electrolyte for formation is a 100-1000 µS/cm, preferably 500 µS/cm, citric acid concentration. In the case of an aluminum anode foil, the formation process results in the formation of aluminum oxide ($Al_2O$) on the surface of the anode foil. The thickness of the oxide deposited or "formed" on the anode foil is proportional to the applied voltage, roughly 10 to 15 Angstroms per applied volt.

The etched and formed anode foils can be cut and used to assemble a capacitor. It is understood to one of ordinary skill in the art that additional steps, or an alternative combination of steps, can be used in processing an etched anode foil.

Additional steps include, but are not limited to rinsing, drying, hydrating, capacitance testing, annealing, and capacitor assembling. These steps can be carried out using any method known to one skilled in the art.

In some embodiments, an etched anode foil can be produced by the methods described above. Anode foils are punched from etched anode sheets. Foil sheets etched in accordance with the methods described above and the resulting anode foils exhibit high capacitance while maintaining high strength.

In some embodiments, an electrolytic capacitor can be formed comprising etched aluminum anode foils, which have been prepared using the methods described above. Such capacitors can be made using any suitable methods known in the art. Non-limiting examples of such methods are disclosed, e.g. in the following references: U.S. Pat. No. 4,696,082 to Fonfria at al., U.S. Pat. No. 4,663,892 to Kenmochi, U.S. Pat. No. 3,872,579 to Papadopoulos, U.S. Pat. No. 4,541,037 to Ross at al., U.S. Pat. No. 4,266,332 to Markarian et al., U.S. Pat. No. 3,622,843 to Vermiyea et al., and U.S. Pat. No. 4,593,343 to Ross, each of which is incorporated herein by reference in its entirety.

Electrolytic capacitors manufactured with anode foils etched according to the methods described above can be utilized in ICUs, such as those described in U.S. Pat. No. 5,522,851 to Fayram, incorporated herein by reference in its entirety. The increased capacitance per unit volume of the electrolytic capacitor will allow for a reduction in the size of the ICD.

Example

A UV curable photopolymer was spread on the surface of an aluminum foil sheet to a thickness from about 10 to 50 µm. The photopolymer was dried on the surface of the aluminum foil at 50 CC until completely dry (~10 minutes). A $\frac{1}{16}^{th}$ inch (1.5875 mm) thick template with through-holes with 1 mm diameters and 2.5 mm center-to-center spacings was placed against the foil exposing only the openings to UV light. The exposed areas were cured with UV light.

After the UV light cured the photopolymer in the exposed areas, alcohol was used to remove the uncured photopolymer. A photopolymer pattern mimicking the template was now on the surface of the aluminum foil. The foil was placed in 95° C. de-ionized water for 20 minutes to create the hydrate layer in the areas without the photopolymer coverage. The foil was then placed in a 25° C. ethyl lactate solution for 2 minutes to remove the photopolymer while leaving the hydrate layer intact. The foil was etched electrochemically to form a etch pattern of tunnels in the aluminum foil. The resulting etch pattern mimicked the original template pattern.

By controlling the position of tunnel initiation, foils can be etched more uniformly and have optimum tunnel distributions. The processes described herein to initiate tunnel formation obviates undercutting of the patterned resist and allows for controlling tunnel initiation on a micron or submicron scale, for example on a 100 nm to 5 µm scale. The hydrate layer is incorporated into the metal surface by the hydration process and reduces the possibility of unintentional release. Also, tunneling does not begin in directions other than orthogonal to the foil surface because the hydrate layer penetrates into and extends below the metal substrate surface. Accordingly, adjacent tunnels do not merge just below the foil surface, and therefore avoids increasing the brittleness of the foil or reducing the optimization of the morphology of the foil surface associated with adjacent tunnels merging. Controlling tunnel initiation on a micron or sub-micron scale with the use of the protective hydration layer mask can increase the surface area of the foil and raise capacitance by 2.5 to 3 times. The foil can be used as anodes, which in turn are used in assembling a capacitor. The increased surface area for the anodes equates to a reduction in overall capacitor volume of about 50-66% which in terms of current ICD volume is a 9 to 12 cc reduction. Or alternatively, fewer anodes are needed to deliver the same energy output, thereby reducing production costs of the capacitor.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents. While the invention has been particularly shown and described with reference to example embodiments thereof, it will be understood by those skilled in the art that various changes in form and details can be made therein without departing from the spirit and the scope of the invention.

What is claimed is:

1. A method for patterning a metal substrate, the method comprising the steps of:
    applying a photo-sensitive layer on a surface of a metal substrate;
    forming a patterned surface on the photo-sensitive layer;
    removing at least a portion of the patterned surface of the photo-sensitive layer to create a patterned resist and a plurality of unmasked areas on the metal substrate;
    forming a hydrate layer in at least one of the unmasked areas;
    removing the patterned resist to expose at least one portion of the surface of the metal substrate; and
    etching at least one exposed portion of the surface of the metal substrate to initiate tunnels in the metal substrate, thereby forming a patterned metal substrate,
    wherein the hydrate layer acts as a mask during the etching.

2. The method of claim 1, wherein the metal substrate is an aluminum foil.

3. The method of claim 1, wherein the photo-sensitive layer is an ultraviolet-curable photopolymer.

4. The method of claim 1, wherein the patterned surface comprises an array microstructures and the microstructures have a width of in a range from 0.1 to 5 µm and a period in a range from 1 to 3 µm.

5. The method of claim 1, wherein the step of removing at least a portion of the patterned surface comprises etching the patterned surface with a reactive plasma.

6. The method of claim 1, wherein the metal substrate has a first surface and a second surface and the method of claim 1 is performed on both the first surface and the second surface.

7. The method of claim 1, wherein the patterned resist has the same array configuration and is dimensionally proportional to the patterned surface.

8. The method of claim 1, wherein the step of forming a hydrate layer comprises reacting deionized water with the substrate surface to form a metal hydrate.

9. The method of claim 1, wherein the hydrate layer forms a mesh on the surface of the metal substrate leaving exposed metal substrate areas that have a width of in a range from 0.1 to 5 μm and a period in a range from 1 to 3 μm.

10. A method of manufacturing a patterned aluminum foil for use in an electrolytic capacitor, the method comprising the steps of:
   applying a photo-sensitive layer on a surface of an aluminum foil;
   forming a patterned surface on the photo-sensitive layer;
   plasma etching the patterned surface of the photo-sensitive layer to create a patterned resist and unmasked areas on the aluminum foil;
   forming a hydrate layer mesh in the unmasked areas;
   removing the patterned resist to expose the surface of the aluminum foil; and
   electrochemically etching the exposed surface of the aluminum foil to initiate tunneling of the aluminum foil to form the patterned aluminum foil surface,
   wherein the hydrate layer mesh acts as a mask during the electrochemical etching.

11. The method of claim 10, wherein the photo-sensitive layer is an ultraviolet-curable photopolymer.

12. The method of claim 10, wherein the patterned surface comprises an array of microstructures and the microstructures have a width of in a range from 0.1 to 5 μm and a period in a range from 1 to 3 μm.

13. The method of claim 10, wherein the aluminum foil has a first surface and a second surface and the method of claim 11 is performed on both the first surface and the second surface.

14. The method of claim 10, wherein the patterned resist has the same array configuration and is dimensionally proportional to the patterned surface.

15. The method of claim 10, wherein the step of forming a hydrate layer mesh comprises reacting deionized water with the substrate surface to form metal hydrate.

16. The method of claim 10, wherein the hydrate layer mesh forms a honeycomb configuration on the surface of the aluminum foil leaving exposed aluminum foil areas that have a width of in a range from 0.1 to 5 μm and a period in a range from 1 to 3 μm.

17. The method of claim 10, wherein the aluminum foil is used as an anode or cathode in the electrolytic capacitor.

18. A method for patterning a metal substrate, the method comprising the steps of:
   applying a photo-sensitive layer on a surface of a metal substrate;
   forming a patterned surface formed of an array of microstructures on the surface of the photo-sensitive layer;
   removing at least a portion of the patterned surface of the photo-sensitive layer to create (i) a patterned resist having a microstructure array configuration corresponding to and dimensionally proportional to the patterned surface and (ii) at least one unmasked portion of the surface of the metal substrate;
   forming a hydrate layer mesh in the at least one unmasked portion of the surface of the metal substrate;
   removing the patterned resist to expose at least one portion of the surface of the metal substrate; and
   etching the at least one exposed portion of the surface of the metal substrate to initiate tunnels in the metal substrate, thereby forming a patterned metal substrate,
   wherein the hydrate layer acts as a mask during the etching.

19. The method of claim 18, wherein the step of removing the patterned resist comprises placing the substrate in an ethyl lactate solution to remove the patterned resist while leaving the hydrate layer mesh intact.

20. The method of claim 18, wherein the aluminum foil has a first surface and a second surface and the method of claim 18 is performed on both the first surface and the second surface.

* * * * *